P. Kirkham.
Buttons.

Nº 6953.  Patented Dec. 18 1849

UNITED STATES PATENT OFFICE.

PETER KIRKHAM, OF WATERBURY, CONNECTICUT, ASSIGNOR TO W. R. HITCHCOCK & CO.

MANUFACTURE OF BUTTONS.

Specification of Letters Patent No. 6,953, dated December 18, 1849.

*To all whom it may concern:*

Be it known that I, PETER KIRKHAM, of Waterbury, in the county of New Haven and State of Connecticut, have invented a new and useful Improvement in the Manufacture of Buttons; and I do hereby declare that the following is a full, clear, and exact description, reference being had to the accompanying drawings, making a part of this specification.

The nature of my invention consists in substituting wooden molds for the common stuffed metallic shell, and combining the said mold or molds with the ring, or collet in such a manner as to secure the shank and covering of the button inside between the wooden mold, and the collet, or ring.

To distinguish my invention from other modes of making flexible shank, and cloth covered buttons, I will first describe the mode or plan at present employed to manufacture the said button, or buttons.

First; a collet or ring of metal like Figure 3 (a side view). Into this is inserted a piece of fine canvas like Fig. 4. A portion of this canvas, by a punch or die, is forced through the hole *h* in the center of the collet. This piece of the canvas forced through the hole *h*, forms the shank *s* of the button, as seen in Figs. 1, and 7. A piece of paper, or blank mold, represented by the side view Fig. 6, is then inserted into the collet on the top of the canvas, and then a metal shell represented by the perspective view Fig. 2, is covered with some textile fabric like Fig. 5; and then the collet, and the covered shell are combined together, by the collet being forced into the shell, along with the edges of the covering, and the rim of the shell then pressed down upon the flange of the collet, forming a button like Fig. 1, (a side view).

To obviate the using of the metallic shell and the paper blank or filling, I first form a solid mold of wood like Fig. 8 (a side view). This mold has two grooves, *g, g*, made around it for the inside, leaving a small core or pith *f*, in the center. These grooves *g g* correspond with two flanges, or rims *b*, formed on the collet Fig. 9. I then take a piece of canvas, Fig. 10, and place it in the collet Fig. 9, forcing, with a tool, part of the canvas through the hole seen in the center of the collet or ring Fig. 9. The top or mold Fig. 8, is then covered with some textile fabric, like that represented by Fig. 11, and then by proper tools, the top or mold Fig. 8, and the ring or collet Fig. 9, are pressed together, the flanges of the collet, with the covering Fig. 11, being pressed into the grooves *g g*, uniting firmly the wooden mold and the metal collet, securing the shank and the covering inside, and forming a button like that represented in the side view Fig. 7. A button thus formed, is stronger, and not so heavy, as one formed in the old way without a wooden mold. The collet and the wooden mold may be formed like those represented in Figs. 23 and 24; also, it may be made without a canvas shank, or a metal collet like Fig. 9, by forming a solid mold of wood like Fig. 14, (a vertical section), which has a hole made through the center of it, in which is inserted a metal eye or wire E Fig. 16, or a piece of cord like Fig. 15, securing the same in the mold, as represented in Fig. 14, after which, the said mold may be forced into the metal cup Fig. 13, which may be covered with some suitable fabric, and by proper dies, the fabric will be gathered inside between the cup and the mold, and the edge of the cup or cover Fig. 13, is pressed on to the bevel edge *a a* of the mold Fig. 14, forming a strong light button like Fig. 12, the face or underside of it presenting a surface of varnished wood. I also form a silk back button by forming a metal top, and a wooden mold for the bottom, by reversing the collet and wooden mold of Fig. 7.

Figure 1:
Figure 2:
Figure 3:
Figure 4:
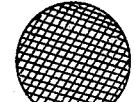
Figure 5:
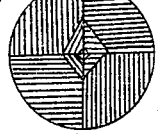
Figure 6:
Figure 7:
Figure 8:
Figure 9:
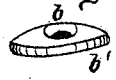
Figure 10:
Figure 11:
Figure 12:
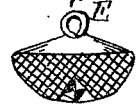
Figure 13:
Figure 14:
Figure 15:
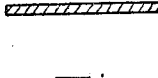
Figure 16:
Figure 18:
Figure 19:
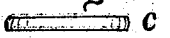
Fig. 19, is a metal top for a plain covered surface. This metal top is a shallow round shell with a flange *c* on it.
Figure 20:
Fig. 20, represents a wooden mold. It is covered with plain silk, as is the cover or top Fig. 19.
Figure 21:
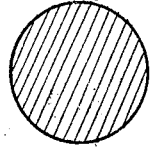
Figure 22:
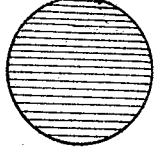
Figure 23:
Figure 24:

Figs. 21, and 22, represent the covering fabric. It is to form a button covered entirely with some textile fabric, or fabrics. By proper tools, or dies, the top, Fig. 19, with the covering Fig. 22 on it, and the mold Fig. 20, with its covering Fig. 21, on it, are pressed firmly together, securing the edges of the covering inside, by the edge of the top, being pressed down on the bevel edge *a a* of the wooden mold Fig. 20, thus forming a button like Fig. 18, (a side view).

I do not confine my claim to any particular form. I have represented and described various ways to place the wooden mold, to form the same kind of button, and to make it of different forms, both entirely, and partly covered with some textile fabric.

Having thus described my invention, I claim—

The new and useful improvement in the manufacture of buttons, of substituting a wooden mold for the common metallic shell that is stuffed with paper, and using the said wooden mold either for the top or bottom of the button, and covering the button entirely or only part of it, with some textile fabric or substance, and securing the shank and the covering inside between the wooden mold and ring, or collet of the button, in the manner herein represented and described.

PETER KIRKHAM.

Witnesses:
R. MACFARLANE,
J. C. WELTON.